United States Patent
Augeraud et al.

(10) Patent No.: US 6,333,481 B2
(45) Date of Patent: Dec. 25, 2001

(54) PROCESS AND UNIT FOR PLASMA-ARC WORKING WITH A GAS MIXTURE BASED ON HYDROGEN, NITROGEN AND/OR ARGON

(75) Inventors: Regis Augeraud, Pontoise; Andre Borne, Bessancourt; Michel Delzenne, Franconville, all of (FR)

(73) Assignee: L'Air Liquide, Societe Anonyme pour l'Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 09/784,190

(22) Filed: Feb. 16, 2001

(30) Foreign Application Priority Data

Feb. 18, 2000 (FR) .................................................. 00 02026

(51) Int. Cl.$^7$ ................................................... B23K 10/00
(52) U.S. Cl. .............................. 219/121.59; 219/121.44; 219/121.55; 219/121.54
(58) Field of Search .................... 219/121.59, 121.54, 219/121.55, 121.51, 121.48, 121.39, 121.44, 121.46, 75

(56) References Cited

U.S. PATENT DOCUMENTS 3,567,898   3/1971  Fein .
5,414,236 * 5/1995  Couch, Jr. et al. ............. 219/121.39
5,416,296   5/1995  Walters .
5,653,896 * 8/1997  Couch, Jr. et al. .

FOREIGN PATENT DOCUMENTS 44 07 913   10/1994  (DE) .

* cited by examiner

Primary Examiner—Mark Paschall
(74) Attorney, Agent, or Firm—Young & Thompson

(57) ABSTRACT

Process and unit for the arc working, particularly plasma cutting, of a workpiece, in which a plasma torch is supplied with an electric current and with a gas mixture containing hydrogen and nitrogen and/or argon, and a plasma jet obtained by the ionization of the gas mixture by the electric current is delivered by means of the plasma torch. The hydrogen concentration in the gas mixture containing hydrogen and nitrogen and/or argon is less than 50%. The gas mixture is obtained by adding a defined amount of hydrogen to nitrogen and/or argon, immediately before the gas mixture is introduced into said torch. The defined amount of hydrogen is defined according to the thickness of the workpiece, to the grade of the constituent material of the workpiece, to the desired work rate and/or to the intensity of the electric current.

11 Claims, 2 Drawing Sheets

Figure 1:
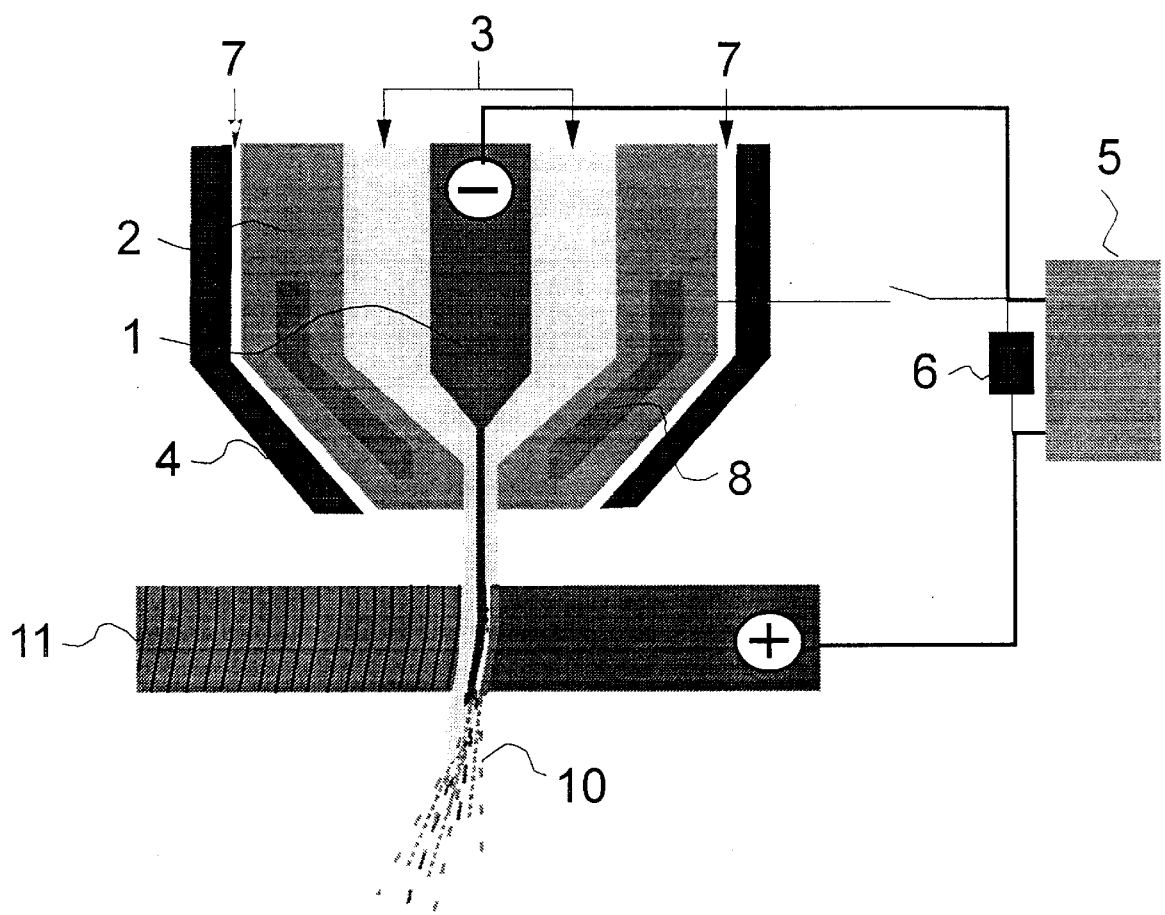

PROCESS AND UNIT FOR PLASMA-ARC WORKING WITH A GAS MIXTURE BASED ON HYDROGEN, NITROGEN AND/OR ARGON

The present invention relates to a plasma-arc work process using a plasma torch supplied with a gas mixture containing hydrogen and nitrogen and/or argon, the amount of hydrogen in the mixture being defined according to one or more parameters chosen from the thickness and/or the grade of the constituent material of the workpiece, the desired work rate and the intensity of the electric current.

A plasma-arc torch that can be used in a cutting, welding, marking or spraying operation, or in any other heat-treatment operation, on a metallic or nonmetallic material usually comprises an electrode made of copper or of a copper alloy carrying a cylindrical insert generally made of hafnium, tungsten or zirconium, on which the electric arc serving to ionize the gas feeding the torch takes root, that is to say the defined flow rate of pressurized gas, called plasma gas, which is delivered between the electrode and the nozzle and which flows out via an orifice of said nozzle toward the workpiece.

The electrode is generally centered above this orifice for ejecting the plasma jet, which is placed axially in the nozzle and forms a constriction diaphragm.

In the particular case of a plasma cutting operation, the plasma cutting device or system usually comprises a plasma torch, a source of electric current, an electric-arc ignition system and one or more sources of fluids, particularly of plasma gas, possibly of shielding gas or of post-injected fluid, and of fluid for cooling the torch, generally distilled water.

Such torches or units are well known to those skilled in the art, since they have already been described in many documents to which reference may be made for further details, especially EP-A-599709, EP-A-872300, EP-A-801882, EP-A-941018, EP-A-144267, EP-A-410875, EP-A-772957, EP-A-902606, EP-A-810052, EP-A-845929, EP-A-790756, EP-A-196612, WO-A-89/11941, U.S. Pat. No. 4,521,666, U.S. Pat. No. 4,059,743, U.S. Pat. No. 4,163,891 and U.S. Pat. No. 5,591,357.

In a known manner, plasma-arc cutting uses the thermal and kinetic effects of a plasma jet to melt the material to be cut and to expel the molten material from the kerf formed after the torch has moved relative to the workpiece.

Moreover, it is also known that, in plasma cutting, the plasma gas or gas mixture used is not the same depending on the nature of the material to be cut.

Thus, a nonoxidizing gas, for example nitrogen, is generally used for stainless steels or for light alloys, whereas it is preferred to use an oxidizing gas, such as oxygen or air, for cutting structural steels.

Conversely, when cutting stainless steels or light alloys, it is generally gas mixtures consisting of argon and hydrogen, or indeed sometimes gas mixtures consisting of nitrogen and hydrogen, which are used.

It is known in fact that the use, in certain cases, of a binary mixture of argon and hydrogen as plasma gas, in concentrations ranging from 20 to 35% hydrogen, makes it possible to reduce the taper and to maintain an unoxidized cut face for large thicknesses.

Moreover, ternary mixtures of argon, nitrogen and hydrogen can be used to cut small thicknesses.

However, these gas mixtures consisting of hydrogen and argon and/or nitrogen are usually premixed, that is to say manufactured according to the chosen contents, before being used to fill suitable containers, such as gas bottles, which are then taken to the operating site, that is to say the point where the cutting has to be carried out.

Now, the fact that these types of gas mixtures must be premixed and contained in gas bottles poses a problem.

Thus, it will be understood that, when such a gas mixture has to be used with different hydrogen contents in the nitrogen and/or argon in order to comply with several different cutting applications or situations, it is necessary to store as many gas bottles as desired contents, that is to say hydrogen/nitrogen/argon mixtures having different hydrogen contents.

This therefore requires the use of a large stock of gas bottles of different compositions suitable for the various situations that might arise and also requires many bottle movements and handling operations.

Under these conditions, it is essential to put into place strict procedures for storing and handling each bottle, as well as precise monitoring of the stocks in order to prevent any shortage in terms of a particular gas mixture, something which is difficult to manage and involves relatively large financial investment and operating costs.

The object of the present invention is therefore to solve these problems of bottle storage and movement while making it easier to use gas mixtures having different hydrogen contents.

In other words, the aim of the present invention is to provide a plasma-arc work process using gas mixtures having variable hydrogen contents compatible with various arc-work situations, particularly various material-cutting situations, while at the same time maintaining or improving the cutting performance in terms of rate, flash and/or roughness of the cut faces.

The present invention therefore relates to a process for the plasma-arc working of at least one workpiece, in which:

(a) a plasma torch is supplied with an electric current and with a gas mixture containing hydrogen and at least one compound chosen from nitrogen and argon, (b) a plasma jet obtained by the ionization of at least part of said gas mixture containing hydrogen and at least one compound chosen from nitrogen and argon by said electric current is delivered by means of said plasma torch, wherein:
  the concentration of hydrogen in the gas mixture containing hydrogen and at least one compound chosen from nitrogen and argon is greater than 0% by volume and less than 50% by volume,
  said gas mixture is obtained by the addition of a defined amount of hydrogen to a gas containing at least one compound chosen from nitrogen and argon, said addition of hydrogen being carried out immediately before the gas mixture containing hydrogen and at least one compound chosen from nitrogen and argon is introduced into said torch, and
  the amount of hydrogen is defined according to at least one parameter chosen from the thickness of the workpiece, the grade of the constituent material of the workpiece, the desired work rate and the intensity of the electric current.

Depending on the case, the process of the invention may include one or more of the following characteristics:

the process is a plasma cutting or plasma marking, preferably plasma cutting, process;
  the concentration of hydrogen in the gas mixture containing hydrogen and at least one compound chosen from nitrogen and argon is between 10% by volume and 40% by volume, preferably between 20% by volume and 35% by volume;

the gas mixture contains nitrogen and argon;

the addition of hydrogen is carried out in at least one gas mixer, preferably said gas mixer including means for controlling or adjusting the hydrogen content;

the defined amount of hydrogen is defined according to the thickness of the workpiece and to at least one parameter chosen from the grade of the constituent material of the workpiece, the desired work rate and the intensity of the electric current;

the thickness of the workpiece is between 0.3 mm and 150 mm, preferably between 0.4 mm and 120 mm;

the desired work rate is between 0.4 m/min and 10 m/min, preferably between 0.5 m/min and 5 m/min;

the intensity of the current is between 10 A and 700 A, preferably between 15 and 600 A;

the grade of the constituent material of the workpiece is chosen from stainless steels, aluminum and light alloys, preferably 304L or 316L stainless steels, or A42 aluminum. A steel may or may not include (non-alloy steel) in addition to iron which constitutes it, other addition elements in variable concentrations. Thus, if the content of addition elements is less than 5% by weight, the steel is called a low-alloy steel, whereas if the content of addition elements is between 5% and 10% by weight, the steel is called a high-alloy steel. A stainless steel includes, in addition to the iron which constitutes it, more than 10% chromium and possibly other addition elements in concentrations of 0% to 30%, such as molybdenum, nickel, etc. The main element constituting the light alloys is aluminum, to which is added from 0 to 15% of other elements, such as silicon, manganese, magnesium, etc.;

the flow rate of the gas is less than or equal to 200 1/min;

the pressure of the gas is between 1 and 10 bar.

The invention also relates to a system for the plasma-arc working of at least one workpiece, particularly one capable of implementing a process as mentioned above, which comprises:

at least one plasma torch fastened to a support frame and able to move along at least one axis of movement, at least one current generator connected to said torch, at least one hydrogen source, at least one hydrogen source and/or at least one argon source, and at least one gas mixer supplied with hydrogen by said at least one hydrogen source and with nitrogen and/or with argon by at least one nitrogen source and/or at least one argon source, said gas mixer including means for controlling or adjusting the concentration of hydrogen added to the nitrogen and/or the argon, so as to obtain a gas mixture containing hydrogen and nitrogen and/or argon with a hydrogen concentration in said gas mixture greater than 0% by. volume and less than 50% by volume, the amount of hydrogen being defined according to at least one parameter chosen from the thickness of the workpiece, the grade of the constituent material of the workpiece, the desired work rate and the intensity of the electric current.

Depending on the case, the unit of the invention may include one or more of the following characteristics:

the gas mixer is placed between the hydrogen source and said nitrogen source and/or said argon source, and said torch (21);

means for controlling the flow rate and/or the pressure of the gas mixture are placed between the outlet of the mixer and the inlet of the torch.

The solution of the invention makes it possible to solve the problems of bottle storage and movement while at the same time allowing the use of a gas mixture, particularly a hydrogen/argon gas mixture, the content of which is adjusted so as to optimize the cutting performance in terms of rate, flash and roughness of the cut face.

Thus, using pure or approximately pure gases, the use of a means of adding and controlling the hydrogen content in the nitrogen and/or argon was developed on a plasma cutting machine so as to guarantee the content of each constituent of the mixture suitable for each use.

Controlling the content of each constituent according to the type of application makes it possible to increase the plasma cutting performance according to productivity and/or quality criteria.

Depending on the degree of automation of the unit, the adjustment of the composition of the mixture and of the flow rates of the corresponding pure gases may be carried out directly on the mixer by acting manually on the control members, in accordance, for example, with instructions given in a list of instructions, or else automatically by a control director which controls and adjusts the various parameters associated with the proper operation of the process on the basis of input data supplied by the operator such as: the grade of material to be cut, the thickness of said material and, possibly, other parameters associated with the desired quality and/or productivity.

Precise control of the content of each constituent depending on the type of application makes it possible to increase the plasma cutting performance according to productivity and/or quality criteria.

The hydrogen content in the nitrogen and/or argon is controlled automatically by an external control depending on several parameters, such as the thickness of the sheet, the intensity of the current, the grade of material to be cut, the cutting rate, etc.

FIG. 1 appended hereto shows schematically the operation of the active part of a plasma torch of the dual-flow type, shown during an operation of cutting a sheet 11.

The plasma torch includes an electrode 1 where the electric arc serving to ionize the gas feeding the torch, that is to say the defined flow of pressurized plasma gas, which is delivered and flows into the plasma chamber 3 located between the electrode 1 and the nozzle 2, takes root.

The plasma jet 10 is expelled from the plasma chamber 3 via an orifice made in the nozzle 2 toward the sheet 11 to be cut.

The electrode 1 is centered above the plasma-jet ejection orifice made axially in the nozzle 2 and forming a constriction orifice.

The plasma torch is supplied with electric current by an electric current source 5 connected to an electric arc ignition system 6 allowing a leading arc to be struck between the nozzle 2 and the electrode 1.

FIG. 1 also shows that the torch is of the dual-flow type, that is to say it has a peripheral second nozzle 4 forming a sleeve around the nozzle 2 and that a shielding gas flows through the inter-nozzle space 7 until it reaches the zone of the space lying between the end of the nozzle 2 and the upper surface of the sheet 11.

The nozzle 2 is cooled by a coolant, such as distilled water, circulating in a cooling chamber 8.

Figure 2:
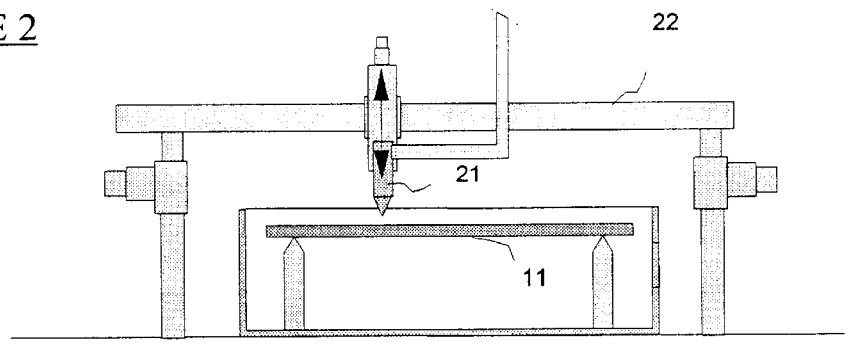

As regards FIG. 2, this shows schematically a plasma cutting unit, seen from the front, comprising schematically at least one plasma cutting torch 21, operating as explained above and illustrated in FIG. 1, fixed to at least one motorized shaft 22 for relative movement of said torch 21 with respect to the workpiece 11, that is to say the sheet to be cut.

Figure 3:
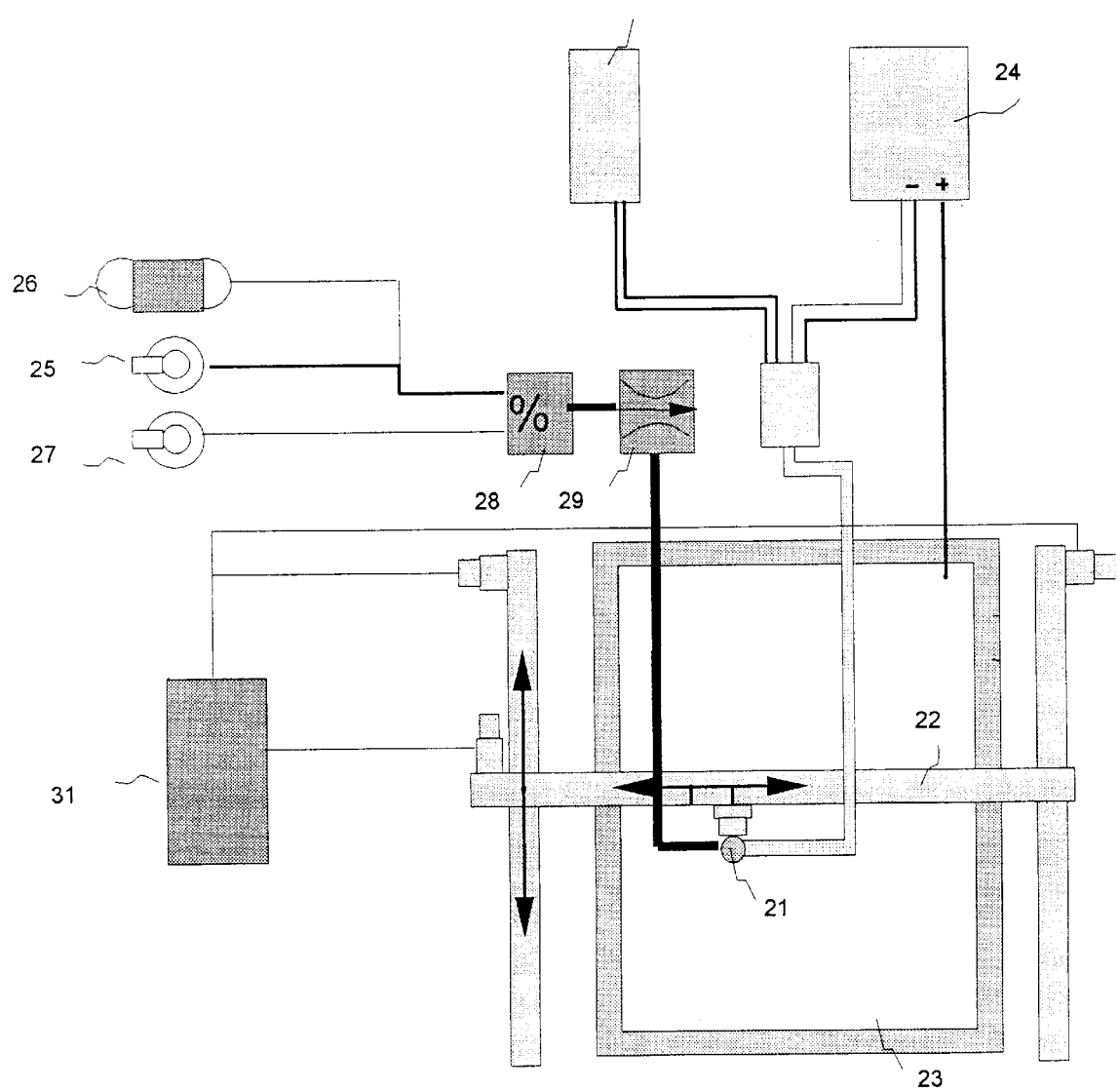

As may be seen in FIG. 3, which is a top view of the unit in FIG. 2, the plasma cutting torch 21 is connected to a current generator 24.

The unit also includes means of connection, of distribution and of information exchange between said current generator 24, the torch 21 and said movement shaft.

An argon supply source 25, a nitrogen supply source 26 and a hydrogen supply source 27 allow the torch 21 to be supplied with the plasma cutting gas mixture.

Between said gas sources 25, 26, 27 and the plasma cutting torch there is a gas mixer 28 which receives the argon and/or nitrogen and hydrogen and delivers the plasma gas mixture to said torch 21 in the required mixture proportions, that is to say having a controlled hydrogen content according to the invention.

The mixer 28 is provided with means for controlling the content of one gas in the other, generally by controlling or adjusting the hydrogen content.

Additional means 29, for controlling the flow rate and/or pressure, for example an expansion valve or a mass flow rate regulator, are preferably inserted between the outlet of the mixer 28 and the torch 21.

Such a unit may furthermore include means 30 for cooling the torch 21, means for managing the work cycles and means 31 for programming and managing the movements of said at least one movement shaft.

The content of one gas in the other is controlled so as to optimize the cutting performance in terms of productivity (increase in cutting speed) or in terms of quality (decrease in flash, roughness or taper) of the cut faces.

Thus, depending on the grade of stainless steel or of light alloy, or more generally on the thickness of the material, argon and/or nitrogen having a controlled hydrogen content of strictly between 0 and 50% will be used.

By using such a unit, the content of one gas in the other, for example hydrogen in argon, is controlled so as to optimize the cutting performance in terms of productivity (increase in the cutting rate) and/or in terms of quality (decrease in flash, roughness or taper) of the cut faces.

The unit in FIG. 3 was used to check the effectiveness of the process according to the present invention; the trials carried out are given in the examples below.

Example 1

Argon+Hydrogen Mixture

A gas mixture containing from 20 to 35% hydrogen in argon, used as plasma gas, made it possible to obtain smooth and nonoxidized cut faces for stainless steel thicknesses of greater than 6 mm and for light alloy thicknesses of greater than 1 mm, by adjusting the hydrogen content according to the thickness and to the grade of the workpiece to be cut, as is apparent from the table below.

| Material | $H_2$ (%) | Ar (%) | Current (A) | Thickness (mm) | Speed (m/min) | Grade |
|---|---|---|---|---|---|---|
| Stainless Steel | 10 to 40 | 90 to 60 | 15 to 600 | 0 to 100 | 0.5 to 5 | 304 L |
| Aluminum | 10 to 20 | 90 to 80 | 30 to 120 | 0 to 30 | 0.5 to 3 | A42 |

-continued

| Material | $H_2$ (%) | Ar (%) | Current (A) | Thickness (mm) | Speed (m/min) | Grade |
|---|---|---|---|---|---|---|
| Aluminum | 35 | 65 | 90 to 120 | 8 to 30 | 0.5 to 3 | A42 |

Advantageously, it is also beneficial to add a shielding gas or gas mixture, taken from argon, nitrogen, hydrogen, hydrocarbons or mixtures thereof, delivered around the periphery of the plasma jet, that is to say it is preferable to use a torch of the dual-flow type, as shown in FIG. 1.

Example 2

Nitrogen+Hydrogen Mixture

For thicknesses of less than 6 mm of the same materials as those in Example 1, a content of 5 to 35% hydrogen in nitrogen and adjusted depending on the thickness and on the grade has also made it possible to improve the cut quality very substantially.

Example 3

Argon+Nitrogen+Hydrogen Mixture

A ternary mixture formed from nitrogen, argon and hydrogen, the hydrogen content of which is adjusted from 2 to 8%, depending on the thickness and on the grade, while maintaining an approximately constant ratio of the argon concentration to the nitrogen concentration, such that the $Ar/N_2$ ratio of the concentrations in % by volume is about 3/16, also makes it possible to very substantially improve the cut quality in the same materials with thicknesses of less than 8 mm.

The plasma cutting process according to the invention, in which a mixer allows various types of gas mixtures to be produced with controlled hydrogen contents, can be used by any type of plasma cutting unit, whether manual or automatic, so as to optimize the cutting performance in terms of productivity and/or quality according to the grade of the material.

The invention has been described above in relation to a plasma cutting torch, but, of course, the application of this invention is not limited to only cutting torches and relates, entirely or partly, to marking, welding and spraying torches and, in general, to any torch for the heat treatment of metallic or non-metallic materials.

What is claimed is:

1. A process for the plasma-arc working of at least one workpiece, in which:
   (a) a plasma torch is supplied with an electric current and with a gas mixture containing hydrogen and at least one compound chosen from nitrogen and argon,
   (b) a plasma jet obtained by the ionization of at least part of said gas mixture containing hydrogen and at least one compound chosen from nitrogen and argon by said electric current is delivered by means of said plasma torch, wherein:
   the concentration of hydrogen in the gas mixture containing hydrogen and at least one compound chosen from nitrogen and argon is greater than 0% by volume and less than 50% by volume,
   said gas mixture is obtained by the addition of a defined amount of hydrogen to a gas containing at least one compound chosen from nitrogen and argon, said addition of hydrogen being carried out immediately before the gas mixture containing hydrogen and at least one compound chosen from nitrogen and argon is introduced into said torch, and the amount of hydrogen is defined according to at least one parameter chosen from the thickness of the workpiece, the grade of the constituent material of the workpiece, the desired work rate and the intensity of the electric current.

2. The process as claimed in claim 1, wherein the plasma-arc work process is a plasma cutting or plasma marking, preferably plasma cutting, process.

3. The process as claimed in claims 1, wherein the concentration of hydrogen in the gas mixture containing hydrogen and at least one compound chosen from nitrogen and argon is between 10% by volume and 40% by volume, preferably between 20% by volume and 35% by volume.

4. The process as claimed in one of claim 1, wherein the gas mixture contains nitrogen and argon.

5. The process as claimed in claim 1, wherein the addition of hydrogen is carried out in at least one gas mixer, preferably said gas mixer including means for controlling or adjusting the hydrogen content.

6. The process as claimed in claim 1, wherein the defined amount of hydrogen is defined according to the thickness of the workpiece and to at least one parameter chosen from the grade of the constituent material of the workpiece, the desired work rate and the intensity of the electric current.

7. The process as claimed in claim 1, wherein the thickness of the workpiece is between 0.3 mm and 150 mm, the desired work rate is between 0.4 m/min and 10 m/min, the intensity of the current is between 10 A and 700 A and/or the grade of the constituent material of the workpiece is chosen from stainless steels, aluminum and light alloys.

8. A unit for the plasma-arc working of at least one workpiece, particularly one capable of implementing a process as claimed in claim 1, which comprises:

at least one plasma torch (21) fastened to a support frame and able to move along at least one axis of movement, at least one current generator (24) connected to said torch (21), at least one hydrogen source (27), at least one nitrogen source (26) and/or at least one argon source (25), and at least one gas mixer (28) supplied with hydrogen by said at least one hydrogen source (27) and with nitrogen and/or with argon by at least one nitrogen source (26) and/or at least one argon source (25), said gas mixer (28) including means for controlling or adjusting the concentration of hydrogen added to the nitrogen and/or the argon, so as to obtain a gas mixture containing hydrogen and nitrogen and/or argon with a hydrogen concentration in said gas mixture of greater than 0% by volume and less than 50% by volume, the amount of hydrogen being defined according to at least one parameter chosen from the thickness of the workpiece, the grade of the constituent material of the workpiece, the desired work rate and the intensity of the electric current.

9. The unit as claimed in claim 8, wherein the gas mixer (28) is placed between the hydrogen source (27) and said nitrogen source (26) and/or said argon source (25), and said torch (21).

10. The unit as claimed in claim 8, wherein means (29) for controlling the flow rate and/or the pressure of the gas mixture are placed between the outlet of the mixer (28) and the inlet of the torch (21).

11. The unit as claimed in claim 9, wherein means (29) for controlling the flow rate and/or the pressure of the gas mixture are placed between the outlet of the mixer (28) and the inlet of the torch (21).

* * * * *